April 6, 1965     W. F. WARD     3,176,359
CLAMPING DEVICE
Filed Nov. 20, 1961
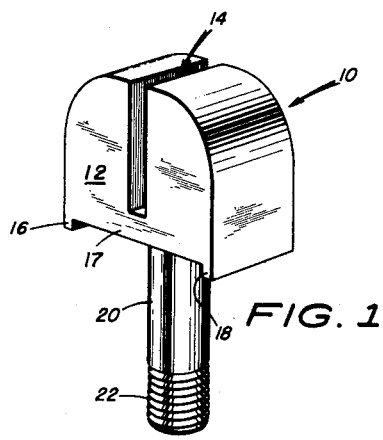
FIG. 1.
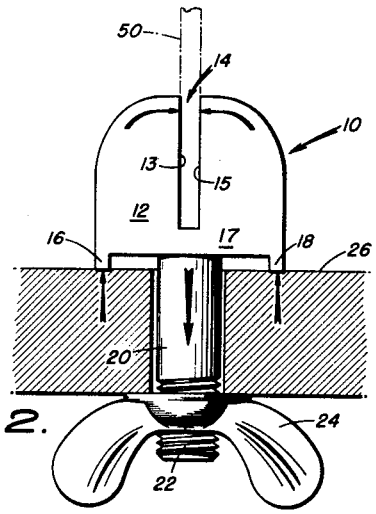
FIG. 2.
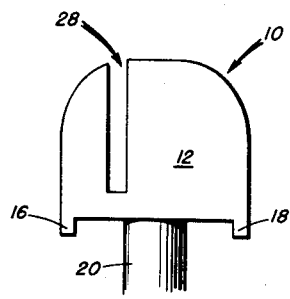
FIG. 3.
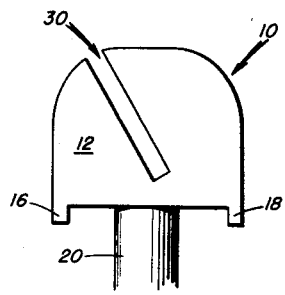
FIG. 4.
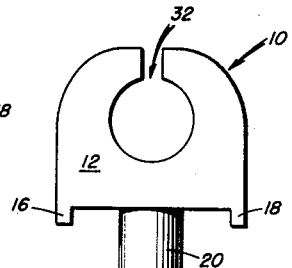
FIG. 5.
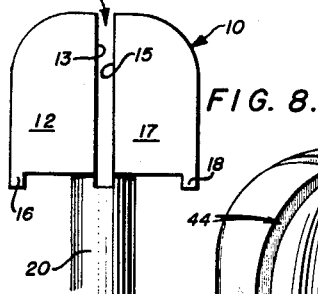
FIG. 8.
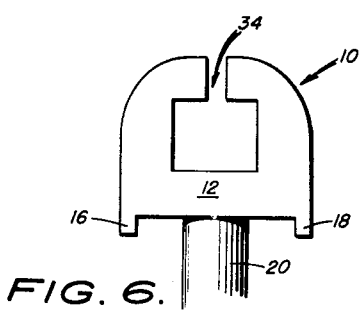
FIG. 7.
FIG. 6.
WILLIAM F. WARD
INVENTOR
BY *Walter G. Finch*
ATTORNEY

Header omitted 3,176,359
CLAMPING DEVICE
William F. Ward, 1706 Kurtz Ave., Lutherville, Md.
Filed Nov. 20, 1961, Ser. No. 153,623
4 Claims. (Cl. 24—73)

This invention relates generally to fastener devices, and more particularly it pertains to clamp fasteners for securing panels by their edges.

Occasion often arises where it is required to fasten a panel by its edge to a support. One application of this kind is in the assembly of a temporary structure such as an office partition. Another example would be in the assembly of a drawer compartment separator. Still another example would be in the assembly of a drawer compartment separator. Still another application for an edge clamp would be for erecting the panels of an electronic enclosure cabinet or an oven.

It is an object of this invention, therefore, to provide a clamping device which grips the edge of a panel with the same operation of securing the panel to a support.

Another object of this invention is to provide a clamp which holds a panel in resilient grip while resiliently tensioning a mounting screw therefor.

Yet another object of this invention is to provide a panel edge gripping device which will position a panel in oblique relationship to a support.

Another object of this invention is to provide a support clamp which holds the side edges of a plurality of panels in contact.

A further object of this invention is to provide a split clamp support for a rod which resiliently grips the rod while resiliently tensioning a mounting screw therefor.

And yet another object of this invention is to provide a panel clamp which is economical to manufacture, efficient and reliable in operational use and revise and easy to install.

Other objects and attendant advantages of this invention will become more readily apparent and understood from the following detailed specification and accompanying drawings in which:

FIG. 1 is a perspective view of a panel clamp embodying features of this invention;

FIG. 2 is a side elevation of the panel clamp shown in FIG. 1 illustrating the principle of operation thereof;

FIG. 3 is a second embodiment of the clamp incorporating features of this invention;

FIG. 4 is a third embodiment of the clamp incorporating features of this invention;

FIG. 5 is a fourth embodiment of the clamp incorporating features of this invention and illustrating its use for supporting a round rod;

FIG. 6 is a fifth embodiment of the clamp incorporating features of this invention and illustrating its use for supporting a square rod;

FIG. 7 is a perspective view of a sixth embodiment of clamp incorporating features of this invention; and FIG. 8 is a side view of a modified clamp of FIGS. 1 and 2.

Referring now to the details of the drawings and especially FIGS. 1 and 2, reference numeral 10 designates generally a clamp fastener. Fastener 10 consists of a block 12 of a resilient material such as tempered metal, plastic, or even wood (with the grain suitably oriented).

The bottom of the block 12 is machined to provide a pair of spaced feet 16 and 18. The top of the block 12 is machined to provide a deep slot 14 of a width corresponding to a panel 50 to be mounted.

This machining as related results in a pair of clamping jaws 13 and 15 and also in a relatively thin web 17 between the spaced feet 16 and 18. A shank 20 is secured to the block 12 and depends normally from the bottom thereof.

In use, the clamp fastener 10 is mounted on a support 26 with its shank 20 extending through a suitable aperture bored therethrough. The panel 50 is placed within the jaws 13 and 15 and a wingnut 24 tightened on threads 22 provided on the shank 20.

It will be noted that the tension (large feathered arrow) on shank 20 is resolved into two pairs of forces (small feathered arrows), the first against the feet 16 and 18 which tends to bend the web 17 downwardly and the second an inwardly directed force of the jaws 13 and 15 against the panel 50 to secure it firmly within the fastener 10.

Inasmuch as the tension is maintained by the elasticity of the material of block 12, a further beneficial locking tension is provided on the wingnut 24 making it possible to dispense with a lock washer at this point.

In the embodiment of the invention shown in FIG. 3, the slot is displaced to one side of the center of the block 12, as shown by reference 28, when it is desired that the panel be mounted off the center line of the shank 20.

As shown in FIG. 4 the slot may be at an angle with the common plane of the feet 16 and 18, as shown by reference numeral 30. In this manner, a panel 50 may be mounted obliquely to the support.

The gripping force may be increased by reducing the area of contact to the panel by relieving the jaws with a key hole slot or a T-configuration slot as designated respectively by reference numerals 32 and 34 in FIGS. 5 and 6.

In addition, the latter variations of the clamp 10 may also be used for gripping a round rod or rectangular bar introduced into the aperture formed by the keyhole or T machined slot.

A further embodiment of the clamp fastener 10 is shown in FIG. 7. Here the block is in a hemispherical shape 40 and there are two slots 44 and 46 formed therein at right angles to one another. Four feet 42 are formed by milling the underside of the hemispherical block 40 directly beneath the deep slots 44 and 46 to form resilient webs 47.

In this case two or more panels mounted in side edge juxtaposition will not only be clamped in the block 40 but also will be urged into a closer side edge contact at their junctions. This is because the resolution of clamping forces is such as to tend to close the quadrant portions of the block 40 inwardly in a radial manner when the webs 47 and 48 simultaneously flex under the tension of shank 20 secured axially at the bottom of the block.

If desired, the spaced feet 16 and 18 can be eliminated or shortened to lie in the same plane as the bottom of the web 17 and the aperture in the support 26 can be enlarged at its upper end so that clamping jaws 13 and 15 contact the support 26 at their extreme lower and outer ends, with the result that when the wingnut 24 is tightened on the shank 20, the clamping jaws 13 and 15 are drawn together in the same manner as previously described.

In some instances, it may be desired to extend the lower edge of the deep slot 14 into the shank 20 so that panel 50 will likewise be extended into the shank 20 to obtain contact with the support 26, as best illustrated in FIG. 8.

Obviously many modifications and variations of the present invention are possible in light of the above teachings. It is, therefore, to be understood that within the scope of the appended claims the invention may be practiced otherwise than as specifically described.

What is claimed is:
1. A clamp fastener for holding an object in resilient grip, comprising a resilient structure provided with four feet substantially equally spaced about the periphery of the bottom thereof and four spaced jaws forming a pair of intersecting slots at the top thereof, each slot of said pair of intersecting slots being of a width corresponding to said object to be mounted and extending from side to side of said structure and downwardly into said structure to form a pair of thin intersecting webs between said four feet, means secured to and depending from the bottom of said structure and arranged to pass through an aperture in a base, and means for tightening on said depending means when said clamp fastener is positioned in said apertured base.

2. A clamp fastener for holding an object in resilient grip, comprising a resilient structure provided with a pair of spaced feet at the bottom thereof and a pair of spaced jaws forming a slot at the top thereof extending from side to side of said structure and being of a width corresponding to said object to be mounted, means secured to and depending from the bottom of said structure and arranged to pass through an aperture in a base, said slot extending downwardly through said structure between said pair of spaced feet and into said depending means, and means for tightening on said depending means when said clamp fastener is positioned in said apertured base.

3. A clamp fastener as recited in claim 2, wherein said depending means is a threaded shank and said tightening means is a nut.

4. As an article of manufacture, a bolt fastener for holding an object in resilient grip, said bolt fastener having a shank and an integral head on said shank, said head being formed of a thin deformable elastic base and at least a pair of solid, opposing non-deformable spaced forms extending upwardly from said base and forming a spacing therebetween and at least a pair of spaced feet extending downwardly from said base at opposite ends thereof beneath said spaced forms, whereby when said feet of said bolt fastener are positioned against a surface, and an object of a width no greater than said spacing between said forms is inserted in said spacing, said object is securely gripped by said forms when said bolt is tightened, with said feet of said bolt head preventing rotation of said bolt relative to said surface.

References Cited in the file of this patent
UNITED STATES PATENTS

| | | |
|---|---|---|
| 213,595 | Thorp | Mar. 25, 1879 |
| 446,486 | Van Bentuysen | Feb. 17, 1891 |
| 701,222 | Reinle | May 27, 1902 |
| 725,711 | Howes | Apr. 21, 1903 |
| 1,274,280 | Koob | July 30, 1918 |
| 1,686,678 | Burke | Oct. 9, 1928 |
| 1,745,876 | Swars et al. | Feb. 4, 1930 |
| 1,747,495 | Vanderveld | Feb. 18, 1930 |
| 1,984,138 | Kennedy | Dec. 11, 1934 |
| 2,461,082 | Purnell | Feb. 18, 1949 |
| 2,555,053 | Myrick et al. | May 29, 1951 |

FOREIGN PATENTS

| | | |
|---|---|---|
| 829,683 | France | Apr. 16, 1938 |
| 1,062,908 | France | Dec. 9, 1953 |
| 328,603 | Great Britain | Apr. 30, 1930 |
| 303,623 | Switzerland | Feb. 16, 1955 |